Oct. 2, 1956                  H. L. DAY                  2,765,042
POWER STEERING APPARATUS OF THE HYDRAULIC TYPE
Filed Sept. 9, 1952                                4 Sheets-Sheet 1
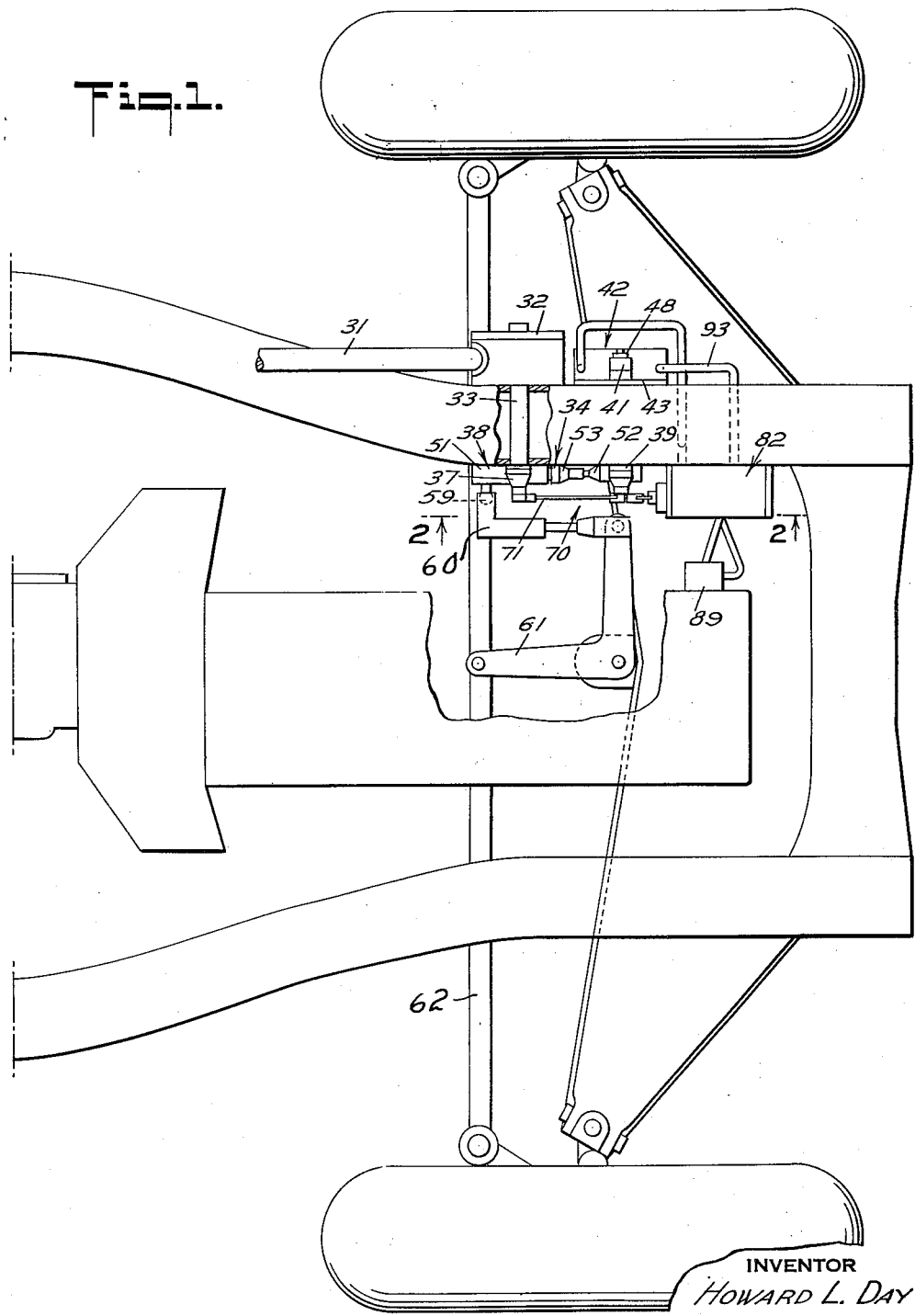
INVENTOR
HOWARD L. DAY
BY
Gardner & Zimmerman
ATTORNEYS Oct. 2, 1956  H. L. DAY  2,765,042
POWER STEERING APPARATUS OF THE HYDRAULIC TYPE
Filed Sept. 9, 1952                           4 Sheets-Sheet 2

INVENTOR
HOWARD L. DAY
BY Gardner and Zimmerman
ATTORNEYS

Oct. 2, 1956 H. L. DAY 2,765,042
POWER STEERING APPARATUS OF THE HYDRAULIC TYPE
Filed Sept. 9, 1952 4 Sheets-Sheet 3
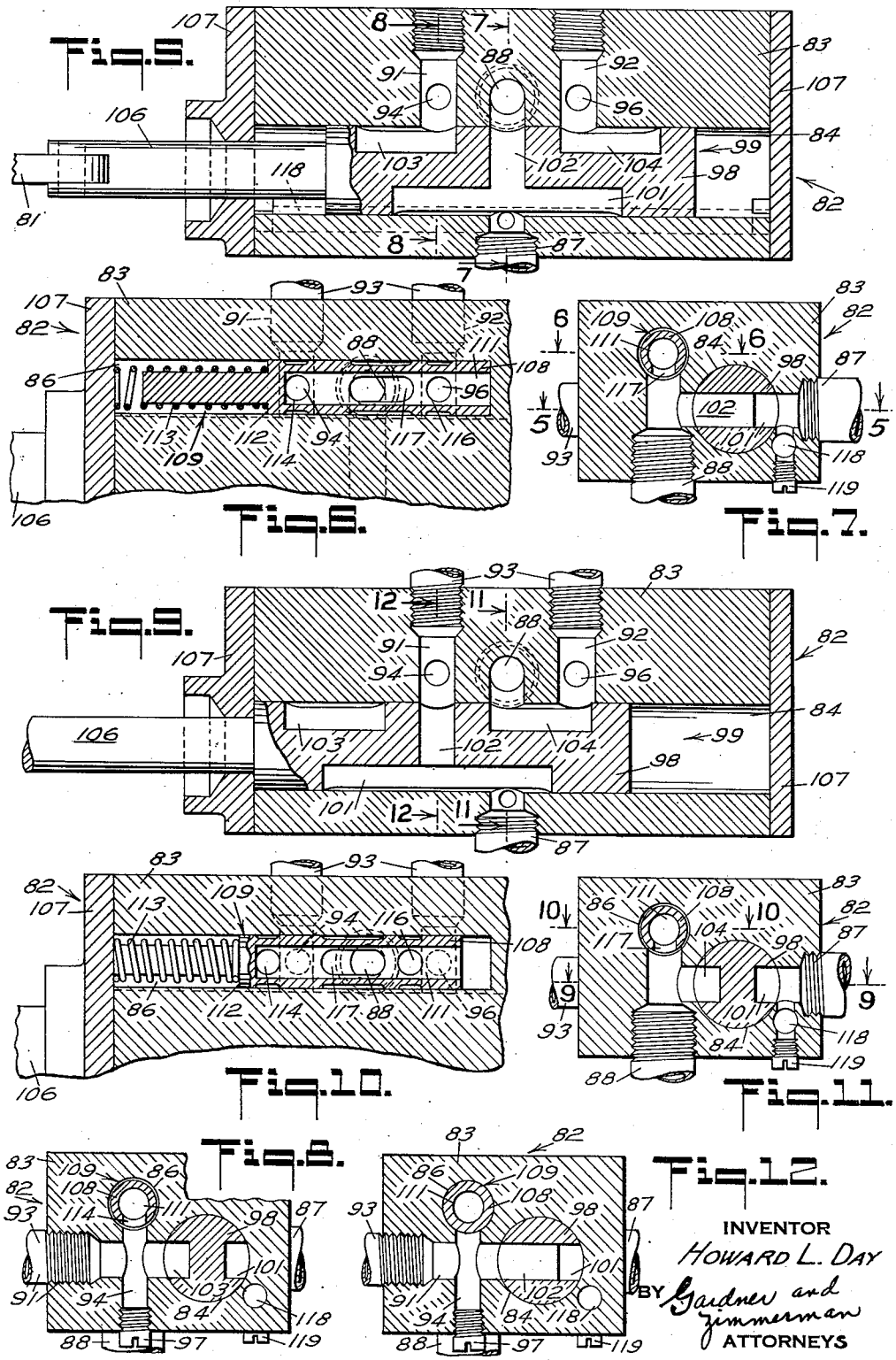
INVENTOR
HOWARD L. DAY
BY Gardner and Zimmerman
ATTORNEYS Oct. 2, 1956         H. L. DAY         2,765,042
POWER STEERING APPARATUS OF THE HYDRAULIC TYPE
Filed Sept. 9, 1952         4 Sheets-Sheet 4
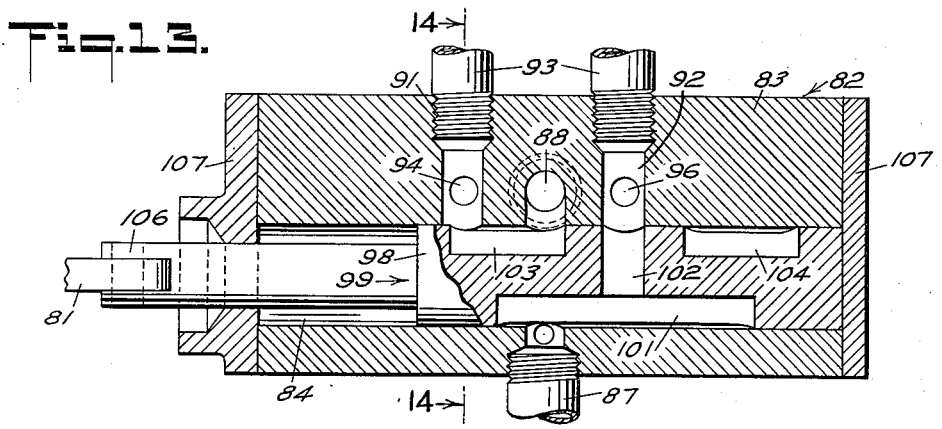
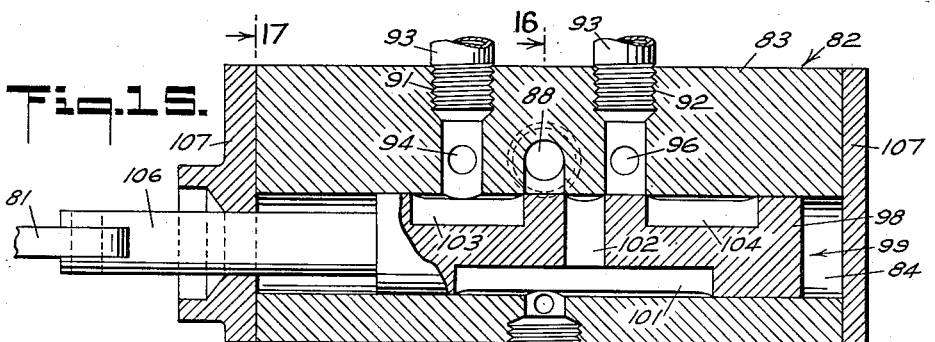
INVENTOR
HOWARD L. DAY
BY
Gardner + Zimmerman
ATTORNEYS United States Patent Office 2,765,042
Patented Oct. 2, 1956

2,765,042

POWER STEERING APPARATUS OF THE HYDRAULIC TYPE

Howard L. Day, Oakland, Calif.

Application September 9, 1952, Serial No. 308,591

4 Claims. (Cl. 180—79.2)

The present invention relates to an improved power steering apparatus and in particular to a hydraulic system adapted to cooperate with the steering mechanism of vessels or vehicles as for example automobiles and operating to provide steering power.

Power steering has long been known and has been utilized on large naval vessels for many years where the force required to move or turn the steering gear is much greater than can be manually applied. Generally, however, systems developed for this purpose are quite large and complicated, there being no stringent limitation in this respect. Within relatively recent years certain of these systems have been adapted and improved for use on trucks and automobiles and early tests in this field indicate that material improvements in automobile handling may be expected therefrom.

Present systems adaptable for the steering of automobiles and trucks are quite complicated in that they employ a large number of moving parts. Further, conventional systems generally include the entire steering mechanism which differs materially from ordinary manual steering devices so that the overall cost and complexity of power steering is maximized and ready conversion of manual steering to power steering is not possible. In addition to these limitations on known power steering units failure of the hydraulic systems powering same results in relatively unmanageable manual steering for the inoperative power steering system provides added drag or resistance in the system. The relatively high cost and frequent maintenance required with conventional power steering units further limits the practicability thereof.

The above-noted difficulties and limitations of conventional power steering units stem in part from the general requirement that manual steering control be maintained, in other words that the vehicle respond to manual turning of the steering wheel so that the system in effect provides only the power as dictated by the driver in turning the wheel; the system actually operating somewhat as a booster unit. Attempts to solve this problem include the use of rack and pinion gears operated from the power unit and from the steering wheel and commonly include quite complicated valving devices and even separated steering columns to produce the desired power boosting action.

The present invention overcomes the above-noted limitations in power steering and in addition precludes many others commonly associated with hydraulic systems. This is accomplished by attaining the following objects:

It is an object of the present invention to provide a simple and improved power steering apparatus.

It is also an object of the present invention to provide an improved power steering apparatus for cooperation with steering means of vehicles to supply hydraulic force for turning same in response to steering wheel manipulation whereby a minimum manual force is required to turn the steering means.

Another object of the present invention is to provide an improved power steering apparatus adapted for connection to conventional manual steering systems and providing hydraulic force for steering.

It is a further object of the present invention to provide an improved power steering apparatus having adjustable control means for varying the manual control force required to steer same.

Also an object of the present invention is to provide an improved power steering apparatus for applying hydraulic force in response to manual operation of steering means for steering the vehicle and producing substantially no resistance to manual steering upon failure or deenergization of the hydraulic system.

A further object of the present invention is to provide an improved power steering apparatus for cooperation with manual steering means, and allowing normal turn recovery without power application.

Yet another object of the present invention is to provide an improved power steering apparatus employing unloaded hydraulic pump operation when the steering means is in forward or unoperated position.

It is a still further object of the present invention to provide an improved power steering apparatus operating to hold steering mechanism from undirected turns and applying force thereto to effectuate turns as dictated by manual control means.

An additional object of the present invention is to provide an improved power steering apparatus having control means actuated by conventional steering apparatus applying hydraulic steering force during the entire steering operation from zero to maximum angle of turn.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

In general the present invention contemplates the use of a hydraulic system including a hydraulic pump and a double-acting piston. Valve means connects said pump to said piston to selectively operate the piston which in turn is linked to a power arm operatively connected to the steering linkage of a vehicle such as an automobile. Steering means such as for example a conventional steering wheel and column with worm and sector attached is also linked to the power arm so that movement thereof by the hydraulic piston is limited to the displacement or movement of the steering means. Valve control means are operatively connected between the steering means and the hydraulic valving so that energization of the hydraulic piston is controlled by the steering means. Further particular characteristics include interconnection of the power arm and valve control means whereby complete power steering is effectuated and an adjustable power arm providing predeterminable manual steering force. Also there is included an automatic auxiliary valve freeing the hydraulic piston so that normal return from a turn results and providing an unloaded system for complete manual steering upon hydraulic failure; while in addition provision is made for unloaded pump operation except during actual power turning.

The invention is described below in detail as to elements, connections, and operation and this description may be best understood in reference to the accompanying drawings wherein:

Figure 1 illustrates the power steering apparatus mounted upon an automobile and cooperating with the manual steering mechanism thereof.

Figure 5 is a horizontal sectional view taken longitudinally of the hydraulic valve block at 5—5 of Figure 2, or in Figure 7 and showing the main valve in normal position.

Figure 6 is a sectional view of a part of the hydraulic valve block taken longitudinally thereof at 6—6 of Figure 7 and showing the auxiliary valve in normal position.

Figure 7 is a sectional view taken transversely through the hydraulic valve block at 7—7 of Figure 5.

Figure 8 is a sectional view taken transversely through the hydraulic valve block at 8—8 of Figure 5.

Figures 9–12 are views corresponding to those of Figures 5–8 and showing the valve in operated position.

Figures 13 and 14 are views corresponding to Figures 5 and 6, but showing the valve in another position.

Figures 15 and 16 are views corresponding to Figures 5 and 6, but showing the valve in a different position.

Figure 17 is an end view of the hydraulic valve, partly in section, with the end plate removed, the plane of the view being indicated by the line 17—17 of Figure 15.

Figure 18 is sectional view taken on the line 18—18 of Figure 19, showing a modified form of work valve structure.

Figure 19 is a cross-sectional view taken on the line 19—19 of Figure 18.

Figure 4:
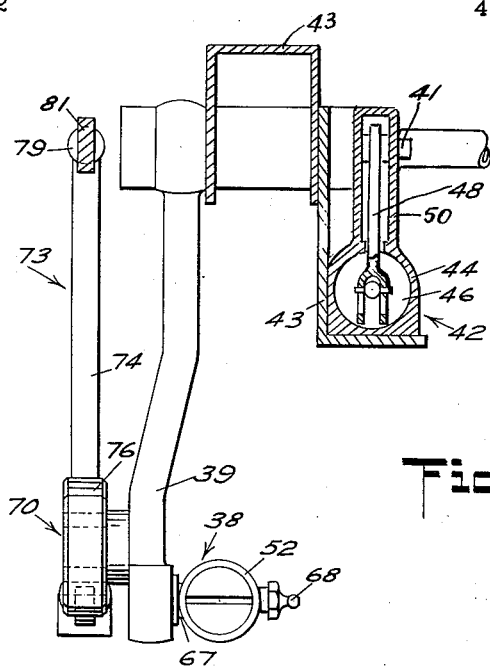
Figure 4 is an end view partially in section of the apparatus taken at 4—4 of Figure 2.

Considering now the elements of a preferred embodiment of the invention as generally illustrated in Figures 1 to 4 it is first seen that the invention is adapted to cooperate with the manual steering means of an automobile or truck and including a steering column 31 having at its lower terminus a conventional worm and sector (not shown) enclosed in a housing 32. A stub shaft 33 extending from the sector is connected to a lever system 34, shown in detail in Figures 2 and 3. Stub shaft 33 may be mounted in a bearing secured to the frame of the automobile or an auxiliary member attached thereto and is connected to a lever arm 37 which extends normal thereto and forming a part of lever system 34. An adjustable power arm or member 38 is pivotally mounted upon the end of lever arm 37, extending on both sides thereof and has in turn a second lever arm 39 pivotally mounted at one end thereof. The second lever arm 39 which may be termed a power lever is pivotally mounted at the other end upon the automobile frame in line with the pivotal mounting of first lever arm 37, as by means of a mounted bearing and a shaft 41 extending therethrough. Lever arms 37 and 39 and power arm 38 are so constructed and the pivotal connections thereof so placed that the four above-noted pivot points, the four ends of the two lever arms, lie at the corners of a rectangle, or are equidistant from adjacent pivot points as in a parallelogram. Further, sector shaft 33 and shaft 41 are rigidly joined to levers 37 and 39 respectively so that rotation of one is transmitted through the lever system to the other.

Attached to lever shaft 41 is a double-acting hydraulic piston unit 42 which may be mounted directly upon the automobile frame or upon a bracket 43 depending therefrom as shown. Hydraulic unit 42 includes a cylinder 44 enclosing a pair of piston heads 46 and 47 rigidly joined together and fitting with the cylinder walls to move together longitudinally within cylinder 44 and in sealing relation thereto. Suitable linking means 48 connects the piston heads of hydraulic unit 42 to lever shaft 41 so that movement of the piston heads produces rotation of lever shaft 41, this linking means being preferably contained within the cylinder and a lateral extension 50 thereof so as to provide a sealed connection, as shown in Figure 4.

Figure 3:
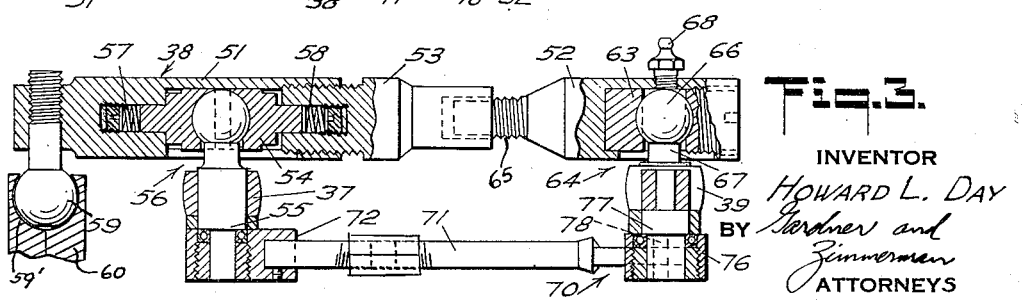
Figure 3 is a partial sectional view of the lever system taken at 3—3 of Figure 2.

Considering now adjustable power arm 38, as shown in Figure 3, it is seen to include a pair of bars 51 and 52 joined by an adjusting plug 53. Bar 51 has a longitudinal bore extending inwardly from one end which is threaded about the end thereof to engage the threaded end of plug 53, bar 52 also having a threaded longitudinal extension 65 thereon engaging a tapped aperture in the end of plug 53. The threads employed at each end of plug 53 are such so that after assembly of lever system 34 with plug 53 in engagement with bars 51 and 52 rotation of plug 53 will not change the overall length of power arm 38 but will only vary the depth that plug 53 extends into the bore of bar 51. Within the bore of bar 51 is disposed in slidable engagement therewith a slide block 54 which may consist of a split block with each part having a hemispherical indentation therein to receive the balled end of a short shaft 55 to comprise a ball and socket connection 56, bar 51 having an elongated aperture therein through which shaft 55 extends. Slide block 54 has at each end thereof a boss or stub shaft extending therefrom and mating with small diameter bores in bar 51 and plug 53, as shown, there being provided within these bores springs 57 and 58. Assembly is made with springs 57 and 58 in slight compression so that they resist movement of slide block 54 in either direction. Attached to shaft 55 is the first mentioned lever 37 thereby providing the pivotal connection to arm 38 noted above and the use of a spherically ended shaft 55 provides advantageous alignment of the elements. Lever arm 37 is rigidly attached to short shaft 55 so that the pivotal relation is provided by the ball and socket connection of shaft 55 to bar 51.

Power arm 38 is arranged to be operatively connected to the steering linkage of the vehicle, and as here shown such connection is made through means of a ball and socket unit including a ball 59 adjustably secured to the arm and seated in a socket 59' provided in a link 60, the latter being connected to a pitman arm 61 which together with said link comprises part of said steering linkage. Pitman arm 61, as is clear from Figure 1, is connected to the radius rod 62 of the turning mechanism for the vehicle wheels. Power arm 38 is also operatively connected to hydraulic piston 42 through power lever 39, the attachment of power arm 38 to lever 39 being accomplished by a ball and socket connection 64, the ball 66 of which is fixed to the lever 39 and seats in a socket of a plug 63 positioned in the end of arm 38 opposite the end in which ball 59 is carried. The ball 66 has extending therefrom a shaft 67 to which is rigidly joined the lever 39. A fitting 68 may be mounted on bar 52 to provide means for lubricating connection 64.

It will be seen from the foregoing that lever system 34 connects the steering control means through the worm and sector to the steering linkage of the automobile and to hydraulic piston 42 so that the movement of each is tied together. Hydraulic piston 42 is connected through power arm 38 to pitman arm 61 so that there is no possible slack or play in the connection, however, the connection of the worm and sector to power arm 38 includes a definite adjustable lag. Thus turning of the steering column 31 is translated through the worm and sector to ball and socket connection 56 which must first move from a normal equilibrium position into forceable contact with power arm 38 to move same, this being described in more detail below.

Mounted upon power arm 38 is a valve control system 70 including an arm 71 parallel to arm 38. Rigidly attached to one end of arm 71 is an apertured connector 72 which engages the shaft 55 of ball and socket connection 56 on power arm 38. Connector 72 is joined to shaft 55 as by a ball race bearing or other suitable means and a washer may be provided about shaft 55 between connector 72 and lever arm 37, said bearing permitting oscillation of connector 72 about shaft 55, but retaining same against longitudinal displacement thereon. Thus arm 71 is effectively joined to lever 37 and is constrained to move therewith. Arm 71 is connected at its other end to a second arm 73 which has a shank 74 with expanded portion 76 at one end thereof. Expanded portion 76 is rotatably mounted upon lever arm 39 as by a shaft 77 extending therethrough adjacent the ball and socket connection thereof to power arm 38 and is provided with a slot therein formed parallel to the plane of lever system 34. The end of arm 71 is flattened to mate with the slot in expanded portion 76 and is pivotally secured therein as by a pin 78 extending through portion 76 and arm 71. The shank 74 of arm 73 extends substantially parallel to lever arm 39 and expanded portion 76 of arm 73 is disposed off-center with respect to shank 74 so that longitudinal movement of arm 71 is transmitted through the pivotal connection thereof to arm 73 to move same transversely with respect to lever arm 39, arm 73 rotating upon shaft 77. Shank 74 has a pivotal connection 79 with a valve link 81, as by a slot and pin, as shown, and link 81 is pivotally connected at its other end to a hydraulic valve 82 described in detail below both as to construction and operation. Although not shown it will be apparent that suitable dust shields are to be provided, as for example by enclosing the entire system.

The valve control system described above will be seen to be rigidly connected to the worm and sector through lever arm 37 so that turning of the steering column 31 is transmitted through arm 71 to pivot arm 73 about shaft 77 and to thereby move valve link 81. Valve control system 70 has no slack or pay therein and as it is rigidly connected to the worm and sector it moves in response thereto. This is to be contrasted with the operation of lever system 34 which includes a predetermined and adjustable slack or delay in ball and socket connection 56. As a consequence of this design turning of steering column 31 forces lever arm 37 to pivot whereby slide block 54 moves in pivot arm 38 against the force of either spring 57 or 58 until it engages bar 51 of power arm 38 and thereupon actuates the lever system. As lever 37 is moving slide block 54 it is also moving arm 71 and actuating valve control system 70 to move valve link 81. Thus a delayed motion of lever system 34 is provided so that initial operation of steering column 31 actuates valve control system 70 without actually moving lever system 34. The movement of slide block 54 before engaging bar 51 of power arm 38 determines the maximum motion of valve control system 70, for once slide block 54 engages member 38 then lever system 34 moves so that further movement of valve link 81 is precluded. This delay in lever system 34 is preferably preadjusted and commonly slide block 54 moves only some one-sixteenth of an inch from normal position into engagement with member 38 to actuate lever system 34. This slight motion is amplified in valve control system 70 by means of the mounting of arm 73 and connection of arm 71 thereto whereby valve link 81 may be moved some substantial distance, as for example ⅜ inch from center position. This motion of valve control system 70 is employed to operate hydraulic valve 82 as set forth below.

Figure 2:
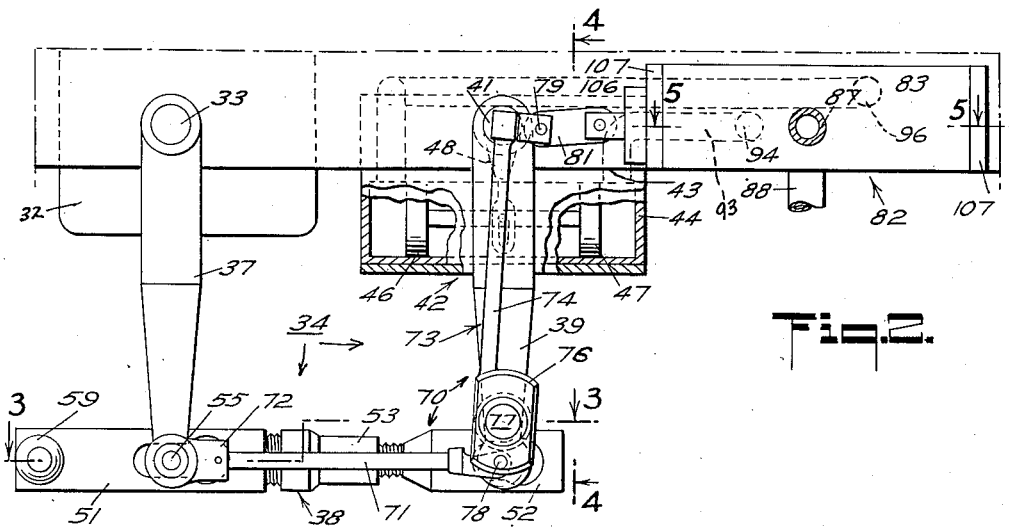
Figure 2 shows the lever system in elevation as taken at 2—2 of Figure 1.

Valve control system 70 controls the hydraulic valve 82 to selectively actuate hydraulic piston 42 and referring now to Figures 5, 6 and 7 there is shown hydraulic valve 82 which includes a valve block 83. A main cylindrical aperture 84 is formed in valve block 83 extending longitudinally therethrough and an auxiliary cylindrical aperture 86 is also formed therein parallel to main aperture 84 and separated therefrom. In order to simplify the following description of hydraulic valve 82 it will be assumed to be oriented as shown in Figure 5 so that main and auxiliary apertures 84 and 86 respectively are horizontally disposed. A pump outlet aperture 87 is provided in the side of valve block 83 communicating with main aperture 84. A vertical pump inlet aperture 88 is provided in the bottom of valve block 83 in back of main aperture 84 and extending directly into auxiliary aperture 86 and horizontally into main aperture 84. Pump apertures 87 and 88 are located centrally of valve block 83 with respect to the ends thereof and a hydraulic pump 89 is connected by tubing to these apertures. In addition to the above, valve block 83 is provided with a pair of parallel piston apertures 91 and 92 extending from the side of block 83 into main aperture 84 perpendicular to and on opposite sides of pump inlet aperture 88. Opposite ends of hydraulic piston 42 are connected to piston apertures 91 and 92 by pipes 93 threadably engaging valve block 83 and entering piston 42, as shown in Figures 1 and 2. Within valve block 83 there is provided a pair of passages 94 and 96 extending between auxiliary aperture 86 and piston apertures 91 and 92 respectively. The apertures and passageways within block 83 may be formed by drilling out block 83 and in this case passages 94 and 96 would be drilled from the bottom side of block 83 and closed to the outside of the block by plugs 97, as shown in Figure 8.

Hydraulic valve 82 includes a main valve 99 adapted to selectively connect hydraulic pump 89 to hydraulic piston 42 and main valve 99 includes a main valve spool 98 which slidably engages block 83 in main aperture 84 thereof and in fluid tight connection therewith. The main valve 99 is thus comprised of spool 98 and the various cooperating apertures and passages of valve block 83 and spool 98, which is not free to rotate, has a longitudinal slot 101 formed in one side thereof and extending some distance in each direction from the center of spool 98. A vertical passage 102 extends from the other side of spool 98 through the center thereof into slot 101 and a pair of identical horizontal slots 103 and 104 are formed in the side of spool 98 extending longitudinally thereof away from the center of spool 98 and displaced somewhat from the center. Extending from one end of spool 98 is a shaft 106 which is pivotally connected to valve link 81 so that spool 98 is movable in response to valve control system 70. A pair of end plates 107 are disposed one at each end of valve block 83 closing apertures 84 and 86 therein and secured by bolts or the like in fluid tight relation to block 83, one of the end plates 107 being apertured to accommodate spool shaft 106.

In addition to main valve 99, hydraulic valve 82 includes an automatic auxiliary or bypass valve 109 comprising a hollow cylindrical piston 108 slidably engaging the walls of auxiliary aperture 86 in fluid tight relation thereto and cooperating with associated apertures therewith. One end of piston 108 is a solid cylinder extending some half the length thereof and of a slightly smaller diameter than the remaining half which constitutes a hollow cylinder having a longitudinal bore 111. There is thus formed about piston 108 a shoulder 112 and a spring 113 is disposed about the solid cylindrical end of piston 108 in compression between shoulder 112 and end plate 107 of valve block 83. Auxiliary aperture 86 in block 83 preferably does not extend the entire length of block 83 so that in normal position auxiliary valve 109 has the piston 108 thereof disposed against the end of aperture 86 under the force of spring 113, as shown in Figure 6. Proper positioning of piston 108 may of course be accomplished in a variety of ways. Three ports are provided in piston 108 and extending through the wall thereof into central bore 111; these being two small ports 114 and 116 which are aligned with passages 94 and 96 respectively when piston 108 is in normal position, and a longitudinally elongated port 117 disposed intermediate ports 114 and 116. There may in addition to the above be provided in valve block 83 a small bore passage 118 extending between opposite ends of main aperture 84 about spool 98 and communicating with auxiliary aperture 86 at the spring end of piston 108, as shown in Figure 17, to equalize pressure exterior to the valve members and prevent retarding forces from being produced. Passageway 118 may be opened to the exterior of block 83 by a small central aperture closed with a threaded plug 119 as shown in Figure 7.

The above described elements and connections of the valve means including main and auxiliary valves 99 and 109 may be more fully understood when considered in connection with the operation thereof as depicted by the different positions of the valving corresponding to certain steering conditions. Thus Figures 5, 6, 7, and 8 illustrate the valve means or mechanism in normal position, that is with the steering linkage directing the vehicle wheels straight ahead or when the wheels are inclined but no turning force is being applied to the steering wheel. In this position pump inlet 88 is connected through spool passage 102 and spool slot 101 to pump outlet 87 whereby hydraulic pump 89 operates unloaded to circulate a hydraulic fluid from pump outlet to inlet. Thus the pump in normal position of the power steering apparatus operates without load to produce a consequent saving in pump wear and power expenditure. In this condition auxiliary valve 109 is disposed by spring 113 with ports 114 and 116 therein in alignment with passages 94 and 96, respectively, and port 117 in alignment with pump inlet 88. Thus communication is provided from one end of hydraulic piston 42 through pipe 93, piston aperture 91, passage 94, auxiliary valve port 114, auxiliary valve bore 111 and port 116, passage 96, piston aperture 92 and thence pipe 93 to the other end of hydraulic piston 42.

Consider now the operation resulting from turning steering column 31. The worm and sector are rotated thus pivoting lever 37 of lever system 34. The first slight movement of lever 37 moves slide block 54 in bar 51 of power arm 38 against the compression of spring 58, for example. The force required to turn steering column 31 is predeterminable by adjustment of power arm 38, this being accomplished by rotating plug 53 clockwise as viewed in Figure 4 to increase the compression of springs 57 and 58 and to increase the resistance to turning of steering column 31. This motion of slide block 54 actuates valve control system 70 to move valve link 81 to the left in Figure 2 and thus to move valve spool 98 to the left within valve block 83. This position of the valve system is shown in Figures 9, 10, 11, and 12. With spool 98 moved to the left, slot 104 in the side thereof is aligned between pump inlet aperture 88 and piston aperture 92 so that hydraulic fluid is pumped through main valve 99 to hydraulic piston unit 42. Piston outlet aperture 92 is connected by pipe 93 to hydraulic piston cylinder 44 at the end adjacent piston head 46. Hydraulic pump 89 is a high pressure pump which thereby exerts through the hydraulic system above described a large force upon piston head 46 to force same to the right in Figure 2. As hydraulic piston 42 is actuated it exerts a force through linkage 48 and shaft 41 to operate lever system 34. Thus as slide block 54 reaches the end of its travel the hydraulic system is actuated as above to operate lever system 34 and to turn the vehicle wheels attached thereto through steering linkage including pitman arm 61 and linkage 60. Oversteering is prevented by the connection of both hydraulic piston unit 42 and sector shaft 33 to lever system 34 so that lever system 34 can turn only so far as sector shaft 33 is turned by the operator through steering column 31.

Movement of piston head 46 in hydraulic piston 42 forces piston head 47 to move also as the two are rigidly connected together to form a double acting piston. Movement of piston head 47 to the right in Figure 2 forces hydraulic fluid out of hydraulic piston unit 42 and this fluid flows into piston aperture 91 and through spool passage 102 now in alignment therewith and thence through spool slot 101 and out pump outlet 87 to the suction end of pump 89. In addition to the above main fluid circuit, auxiliary valve 109 is also actuated by movement of spool 98. Thus, when spool 98 is moved so that there is no longer a fluid short circuit through main valve 99 the fluid pressure immediately increases and this pressure is transmitted through pump inlet 88 and auxiliary valve port 117 to the interior bore 111 of auxiliary valve piston 108. This high pressure fluid exerts a force upon the end of bore 111 to force piston 108 to the left as shown in Figure 10 and to compress spring 113. In this position auxiliary valve ports 114 and 116 are moved out of alignment with passages 94 and 96 so that there is no longer a fluid path between ends of hydraulic piston 42 through auxiliary valve 109. Auxiliary valve port 117 is, however, elongated so that movement of auxiliary valve piston 108 does not move port 117 out of communication with pump inlet 88 and thus auxiliary valve 109 is maintained in operated position by hydraulic pressure as long as main valve 99 is actuated to maintain the pressure. Immediately upon return of main valve 99 to the normal position of Figure 5 the hydraulic pressure in the system drops because pump 89 is short circuited through valve passage 102 and thus auxiliary valve 109 returns to normal position under the force of spring 113 to connect opposite ends of hydraulic piston 42 together. This relieves the pressure on the hydraulic piston so that it exerts no force on the steering linkage and the wheels 62 are free to return to normal position as they would ordinarily do without power steering.

When the steering wheel is turned in the opposite direction rotating the worm and sector to turn lever 37 clockwise through shaft 33 slide block 54 moves to the left in Figures 2 and 3 against the force of spring 57. This moves shaft 55 attached thereto which thereby actuates valve control system 70 to urge valve link 81 to the right in Figure 2. Valve spool 98 thus slides to the right within valve block 83 to the position shown in Figures 13 and 14, Figure 12 being identical to a sectional view through Figure 13 at the centerline of piston aperture 92. In this position communication is provided from hydraulic pump 89 through pump inlet 88, slot 103 of spool 98, piston aperture 91 and pipe 93 to hydraulic cylinder 42 adjacent piston head 47 therein. Hydraulic pump 89 is also connected from pump inlet 88 and auxiliary valve port 117 into the interior bore 111 of piston valve 109 whereby the high pressure hydraulic fluid forces piston 108 against the force of spring 113 into the position shown in Figure 10. Auxiliary valve 109 in this actuated position disposes ports 114 and 116 out of alignment with passages 94 and 96 so that this passageway between ends of hydraulic cylinder unit 42 is closed.

The pressure exerted by the hydraulic fluid upon piston head 47 forces same to move away from the cylinder head and thereby urges piston head 46 toward its cylinder head. Communication is provided from cylinder 44 above piston head 46 through pipe 93, piston aperture 92, spool passage 102 and bottom slot 101 out pump outlet 87 to the pump suction whereby hydraulic pump 89 thereby hydraulically drives hydraulic piston unit 42. As piston 42 moves the movement is translated through linkage 48 and shaft 41 to lever system 34 which thereby moves or pivots to force the steering linkage to turn the vehicle wheels. Here, as when turning in the opposite direction, lever system 34 moves under the control of the steering column rotation, for as both hydraulic piston unit 42 and steering column 31 are connected to lever system 34, pivoting of lever system 34 is limited to the movement of steering column 31.

Actually the power steering system provides only the power and entire control is left in the hands of the driver. Not only does the driver have complete control when turning the wheels but also the wheels return or recover from a turn in the same manner as conventional manual steering, thus obviating the necessity of turning back the steering wheel for the wheels automatically return to normal direction without power interference. It is to be further noted that the manual force required to turn the steering mechanism is adjustable by means of plug 53 of power arm in lever system 34. By varying the compression of springs 57 and 58 through adjustment of plug 53 the system may be varied from one of substantially complete power steering requiring only about three ounces of force to accomplish a turn to one in which only booster power is supplied and ten or more pounds force is required to accomplish a turn.

One further condition of the system is worthy of note and that is an intermediate one where the spool 98 of main valve 99 has moved only so far as to interrupt the short circuit of hydraulic fluid, as shown in Figures 15 and 16. Spool passage 102 is then moved out of alignment with pump inlet 88 and is not yet in alignment with either of the piston apertures 91 or 92. In this circumstance full pump pressure is applied to auxiliary valve 109 thereby actuating same to move the ports 114 and 116 thereof out of alignment with passages 94 and 96 to piston apertures 91 and 92. Thus, hydraulic piston 42 is locked in position, for no communication is provided between the ends thereof. Were it not for the automatic operation of auxiliary valve 109 hydraulic piston 42 would be free to move as dictated by the wheels and power control of the steering would be lost.

Not only are the above described advantages provided by the present steering system but also it is to be noted that, in addition to the natural tendency of the wheels of the vehicle to return to normal, the power system further prevents excursions of the wheels from a directed course. Thus a slight wheel misdirection operates valve control system 70 to move main valve spool 98 into the above described intermediate position wherein the wheels are prevented by hydraulic piston 42 from further turning until wheel motion is sufficient to move main valve 99 to operated position through valve control system 70 whereby the wheels are forced back to their original direction. A further situation to be considered is an emergency one wherein through power failure or ruptured hydraulic lines as by collision hydraulic power is not available from pump 89. Ordinary power steering systems in this circumstance are very difficult to handle manually for the drag of hydraulic fluid in the lines materially increases the manual steering force above that necessary in conventional manual steering mechanisms. The present invention precludes this difficulty by the provision of a large automatic auxiliary valve which operates in such circumstance as a bypass valve to provide direct communication between the opposite ends of hydraulic piston 42. Only when hydraulic pressure is applied to auxiliary valve 109 will same move to actuated position and removal of this pressure immediately results in auxiliary valve 109 returning to normal bypass position under the influence of spring 113. So flexible and foolproof is the system that it may be readily switched from manual to power steering by control of pump 89, although so advantageous is the power steering provided that small opportunity is afforded for choosing manual steering.

While the valve system has been described in connection with one particular mode of construction this was for purposes of simplicity and illustration, there being a multitude of different construction techniques possible. Thus, although valve block 83 is shown as being bored out to form the described passages therein it will be evident that block 83 may be cast including certain of the desired apertures. Reference is made to Figures 18 and 19 in this respect showing a preferred embodiment of valve block 83 and spool 98. Block 83 is shown as being a casting with a central longitudinal aperture 121 cored therein. A cylindrical shell 122 is fitted into aperture 121 and is secured therein by any suitable means. Spool 98 is formed of a central cylindrical core member 123 having flats formed thereon as by casting and corresponding to slots 101, 103, and 104 of spool 98 in Figure 5, for example. An outer hardened cylinder 124 is pressed on core 123 and is very closely fitted with shell 122 by well known machine methods to slidably engage same. Cylinder 124 has in the top thereof five transverse slots as shown, these being numbered for convenience from left to right in Figure 18 as slots 126—130. Cylinder 124 defines with core 123 chambers 101', 103', and 104' corresponding to the slots 101, 103, and 104 respectively in spool 98 of Figure 5 and slots 126 and 127 communicate with chamber 103', while slots 129 and 130 communicate with chamber 104'. The opposite side of cylinder 123 has some three transverse slots 133 therein which communicate with chamber 101' therein and with the transverse passage 102' through core 123 and connecting with central slot 128. Shell 122 likewise has transverse slots cut therein adjacent cylinder apertures 91 and 92 in valve block 83, adjacent pump outlet 87, and aligned with pump inlet 88. The sliding seal of cylinder 124 to shell 123 may be improved by the provision of O rings 134 about cylinder 124 adjacent the ends thereof and inset therein, as shown.

With this latter described construction in which chambers 101', 103' and 104' are provided in place of slots 101, 103, and 104 it is possible to materially reduce the motion required to move spool 98 between normal and activated positions, for the slots communicating with these chambers are made quite narrow. Also the spacing between slots may be made very small because of the very good fit between cylinder 124 and shell 123 which thereby provides adequate sealing without requiring long sealing surfaces. The operation of the valve means shown in Figures 18 and 19 is identical to that described above in connection with the other figures and auxiliary or automatic bypass valve 109 may be made the same as above although this too may be sleeved if desired. Advantage lies in reducing the required travel of valve spool 98 between positions as this then reduces the required motion of slide block 54 and the consequent delayed motion of lever system 34.

There has been described above certain details of construction and operation of the present invention together with an enumeration of a few of the advantages thereof, however, it will be clear to those skilled in the art that innumerable advantages attend the described power steering system and further that many modifications are possible within the spirit and scope of the invention and thus for a precise definition of novelty attention is directed to the following claims.

What is claimed is:

1. An improved power steering apparatus for a vehicle having movable steering control means and steering linkage connected to turning mechanism and comprising a first lever arm pivotally mounted at one end and connected to said steering control means to turn in accordance with the movement thereof, a power arm having the other end of said first lever arm pivotally mounted thereon and being connected to said steering linkage, a second lever arm pivotally mounted at one end and pivotally engaging said power arm at the other end, said lever arms having the same length and being mounted with the distance between respective ends thereof equal to the lever arm length, an hydraulic system including a double-acting hydraulic piston linked to said second lever arm at the pivotal mounting thereof to drive said steering linkage through said power arm, and control means interconnecting said steering control means and said hydraulic system and operatively connected to said power arm to selectively energize said hydraulic piston in accordance with motion of said steering control means to turn said vehicle; said hydraulic system further including a hydraulic pump, valve means connecting said pump and hydraulic piston, and valve control means including a first arm pivotally connected to said first lever at said power arm and a second arm linked to said hydraulic valve for operating same and pivotally connected to said second lever adjacent said power arm, said first and second valve control arms being pivotally connected to each other in alignment with the pivotal connection of said second lever to said power arm whereby said valve control system actuates said hydraulic valve to energize said double-acting piston.

2. An improved power steering apparatus as claimed in claim 1 further defined by said pivotal connection of said first lever to said power arm comprising a spring-loaded slide block mounted within and in slidable relation to said power arm, and a ball and socket connection joining said lever arm to said slide block, said slide block having an adjustable slide travel before forceable engagement with said power arm whereby slight movement of said steering control means actuates said valve control system prior to a direct engagement of said steering control means with said power arm.

3. An improved power steering apparatus for a vehicle having a steering control means and steering linkage connected to turn means and comprising a power arm connected to said steering linkage and adapted to drive same, means mechanically connecting said power arm and said steering control means to limit motion of said power arm, a double-acting hydraulic piston linked to said power arm to move same for actuating said steering linkage, a hydraulic pump having an inlet and outlet, valve means connecting said pump and said piston, said valve means having a normal position connecting said pump inlet and outlet and actuated positions selectively energizing said piston from said pump, and valve control means connected to said steering control means and to said valve means whereby said steering linkage and turn means are power actuated by said steering control means, said valve means comprising a main valve including a valve housing having pump inlet and outlet apertures adapted for connection to said pump inlet and outlet respectively and a pair of piston apertures adapted for connection to opposite ends of said double-acting piston, and a valve spool slidably engaging said valve housing and connected to said valve control system for movement thereby, said valve spool having a plurality of apertures therein including a passage therethrough and having a normal position disposing said passage in communication between the pump inlet and outlet apertures of said valve housing whereby said pump normally operates unloaded and actuated positions selectively providing communication between the pump and piston apertures to control the direction of application of hydraulic force to said piston, an automatic bypass valve connected between opposite ends of said double-acting piston and having a normal open position corresponding to normal position of said main valve and providing communication between opposite ends of said piston whereby same is free to move and having an actuated position closing the bypass between ends of said piston and corresponding to actuated positions of said main valve, said automatic bypass valve including a hollow spring loaded piston having ports therein communicating with the piston apertures of said valve block in normal position and having a further port therein communicating with the pump inlet aperture in said valve block whereby said piston moves against the force of the spring loading thereof upon the application of hydraulic pressure to dispose said ports out of alignment with said piston apertures and returns to normal position under the influence of said spring loading upon release of hydraulic pressure.

4. An improved power steering system for a vehicle having steering linkage attached to wheels thereof and steering control means including a rotatable shaft and comprising a lever system including a power arm connected to said steering linkage to drive same, means connecting the rotatable shaft of said steering control means to said lever system to limit the motion thereof, a double-acting hydraulic piston linked to said lever system to drive said steering linkage therethrough, an hydraulic pump having an inlet and outlet, a main valve connected between said hydraulic piston and pump and having a normal position interconnecting said pump inlet and outlet and activated positions selectively connecting said pump inlet and outlet to opposite ends of said piston to drive same back and forth, valve control means connected to the rotatable shaft of said steering control means and to said main valve to position same in accordance with the position of said steering control means, and an auxiliary valve connected between opposite ends of said main valve and automatically controlled by said main valve to provide communication between ends of said piston when said main valve is in normal position and to close said communication when said main valve is in an activated position.

References Cited in the file of this patent
UNITED STATES PATENTS

| | | |
|---|---|---|
| 1,874,248 | Davis | Aug. 30, 1932 |
| 2,053,301 | Russell | Sept. 8, 1936 |
| 2,219,645 | Bartho et al. | Oct. 29, 1940 |
| 2,268,103 | Bartho et al. | Dec. 30, 1941 |
| 2,385,485 | Baade | Sept. 25, 1945 |
| 2,427,340 | Allison | Sept. 16, 1947 |
| 2,433,651 | Creson et al. | Dec. 30, 1947 |
| 2,447,815 | Price | Aug. 24, 1948 |
| 2,608,263 | Garrison | Aug. 26, 1952 |

FOREIGN PATENTS

| | | |
|---|---|---|
| 118,964 | Sweden | Apr. 2, 1947 |